US008172322B2

(12) United States Patent
Chen (10) Patent No.: US 8,172,322 B2
(45) Date of Patent: May 8, 2012

(54) CHILD SEAT (75) Inventor: Ying-Zhong Chen, Kowloon (HK)

(73) Assignee: BP Children's Products HK Co., Limited, Hong Kong (HK)

( * ) Notice: Subject to any disclaimer, the term of this patent is extended or adjusted under 35 U.S.C. 154(b) by 148 days.

(21) Appl. No.: 12/729,436

(22) Filed: Mar. 23, 2010

(65) Prior Publication Data
US 2010/0244527 A1 Sep. 30, 2010

Related U.S. Application Data (60) Provisional application No. 61/163,455, filed on Mar. 26, 2009.

(51) Int. Cl.
A47D 1/10 (2006.01)
B60N 2/20 (2006.01)
B60N 2/22 (2006.01)

(52) U.S. Cl. .............. 297/256.13; 297/250.1; 297/256.1; 297/354.1; 297/354.12; 297/378.1; 297/378.12

(58) Field of Classification Search ............... 297/256.1, 297/256.13, 354.1, 354.12, 378.1, 378.12
See application file for complete search history.

(56) References Cited

U.S. PATENT DOCUMENTS

| 3,404,917 | A | * | 10/1968 | Smith ......................... 297/256.1 |
| 4,344,649 | A | * | 8/1982 | Fleischer ............. 297/354.12 X |
| 4,842,331 | A | * | 6/1989 | Waples ......................... 297/149 |
| 4,854,638 | A | * | 8/1989 | Marcus et al. ........... 297/256.11 |
| 4,902,070 | A | * | 2/1990 | Casale et al. ......... 297/378.12 X |
| 4,938,603 | A | * | 7/1990 | Turner et al. .................. 297/16.1 |
| 4,998,307 | A | * | 3/1991 | Cone .................... 297/256.13 X |
| 5,018,754 | A | * | 5/1991 | Cheng .................. 297/354.12 X |
| 5,094,505 | A | * | 3/1992 | Nichols ................... 297/378.1 X |
| 5,158,337 | A | * | 10/1992 | Leggett .................. 297/378.1 X |
| 5,183,311 | A | * | 2/1993 | Meeker et al. ................. 297/151 |
| 5,474,355 | A | * | 12/1995 | Lerner et al. ......... 297/256.11 X |
| 5,609,389 | A | * | 3/1997 | Longoria et al. ....... 297/250.1 X |
| 6,033,019 | A | * | 3/2000 | Hession-Kunz et al. ...................... 297/256.13 X |
| 6,334,652 | B1 | * | 1/2002 | Chen et al. ............ 297/256.13 X |
| 6,568,755 | B1 | * | 5/2003 | Groening ................. 297/256.13 |
| 6,666,505 | B2 | * | 12/2003 | Greger et al. ......... 297/354.12 X |
| 6,685,266 | B2 | * | 2/2004 | James et al. ......... 297/378.12 X |
| 6,832,813 | B2 | * | 12/2004 | Tomas et al. ................ 297/250.1 |
| 6,896,326 | B2 | * | 5/2005 | Chen ..................... 297/354.12 X |
| 7,104,603 | B2 | * | 9/2006 | Keegan et al. ............ 297/256.13 |
| 7,201,445 | B1 | * | 4/2007 | Dubiel et al. ............. 297/256.13 |
| 7,219,959 | B2 | * | 5/2007 | Ransil et al. ......... 297/354.12 X |
| 7,229,132 | B2 | * | 6/2007 | Meeker et al. ....... 297/378.12 X |
| 7,328,941 | B2 | * | 2/2008 | Asbach et al. ................ 297/153 |
| 7,364,235 | B2 | * | 4/2008 | Chen et al. ........... 297/354.12 X |

(Continued)

Primary Examiner — Rodney B White
(74) Attorney, Agent, or Firm — David I. Roche; Baker & McKenzie LLP (57) ABSTRACT A child seat comprises a seat part, a backrest operable to rotate relative to the seat part, a backrest adjusting mechanism and a safety lock movably mounted on the backrest. The backrest adjusting mechanism comprises a positioning element mounted stationary relative to the seat part, and a latch element mounted on the backrest and movable to engage with the positioning element. The positioning element comprises a channel that delimits a range of adjustable angular positions of the backrest relative to the seat part. In addition, the safety lock has a lock position adapted to restrict displacement of the latch element relative to the channel, and an unlock position enabling the latch element to move out of the channel when the backrest is moved out of the range of adjustable angular positions toward a position lying substantially parallel with the seat part.

21 Claims, 5 Drawing Sheets

U.S. PATENT DOCUMENTS

| | | | |
|---|---|---|---|
| 7,387,337 B2 * | 6/2008 | Keegan et al. | 297/256.13 |
| 7,497,518 B2 * | 3/2009 | Fritz et al. | 297/354.12 |
| 7,547,066 B2 * | 6/2009 | Mendenhall | 297/378.12 X |
| 7,673,940 B2 * | 3/2010 | Fritz et al. | 297/256.11 |
| 7,695,060 B2 * | 4/2010 | Dubiel et al. | 297/148 |
| 7,828,381 B2 * | 11/2010 | Barger | 297/256.13 |
| 7,871,125 B2 * | 1/2011 | Asbach et al. | 297/256.11 |
| 7,918,497 B2 * | 4/2011 | Keegan | 297/256.13 X |
| 2003/0197408 A1 * | 10/2003 | Greger et al. | 297/354.12 |
| 2010/0102535 A1 * | 4/2010 | Zhong | 297/354.12 X |

\* cited by examiner

CHILD SEAT

CROSS-REFERENCE TO RELATED APPLICATION

This application claims priority benefit of U.S. Provisional Application No. 61/163,455, filed on Mar. 26, 2009.

BACKGROUND OF THE INVENTION

1. Field of the Invention

The present invention relates to child seats, and more specifically to child seats with adjustable backrests.

2. Description of the Related Art

Child strollers can be used for conveniently transporting a child in a seated position. In order to provide optimal comfort, the seat area of the stroller can include an adjustable backrest that can be inclined at different angular position relative to the seat part. For convenient use, some current designs may also allow complete forward folding of the backrest to a position parallel with the seat part. In this configuration, an infant car seat can be directly accommodated on the folded backrest of the stroller, so that the caregiver does not need to transfer the child from the infant car seat to the stroller. While the aforementioned design brings some versatility, the backrest may still accidentally fold in use, which may cause injuries to a child seated in the stroller.

Accordingly, there is a need for a child seat that can address the foregoing issues and provide safer use.

SUMMARY

The present application describes a child seat that can address at least some of the foregoing issues. In some embodiments, the child seat comprises a seat part, a backrest operable to rotate relative to the seat part, a backrest adjusting mechanism and a safety lock movably mounted on the backrest. The backrest adjusting mechanism comprises a positioning element mounted stationary relative to the seat part, and a latch element mounted on the backrest and movable to engage with the positioning element. The positioning element comprises a channel that delimits a range of adjustable angular positions of the backrest relative to the seat part. In addition, the safety lock has a lock position adapted to restrain displacement of the latch element relative to the channel, and an unlock position enabling the latch element to move out of the channel when the backrest is moved out of the range of adjustable angular positions toward a position lying substantially parallel with the seat part.

At least one advantage of the child seat described herein is the ability to provide a safety lock that can prevent accidental displacement of the backrest toward a position parallel with the seat part. The safety of the child seat in use is therefore improved.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
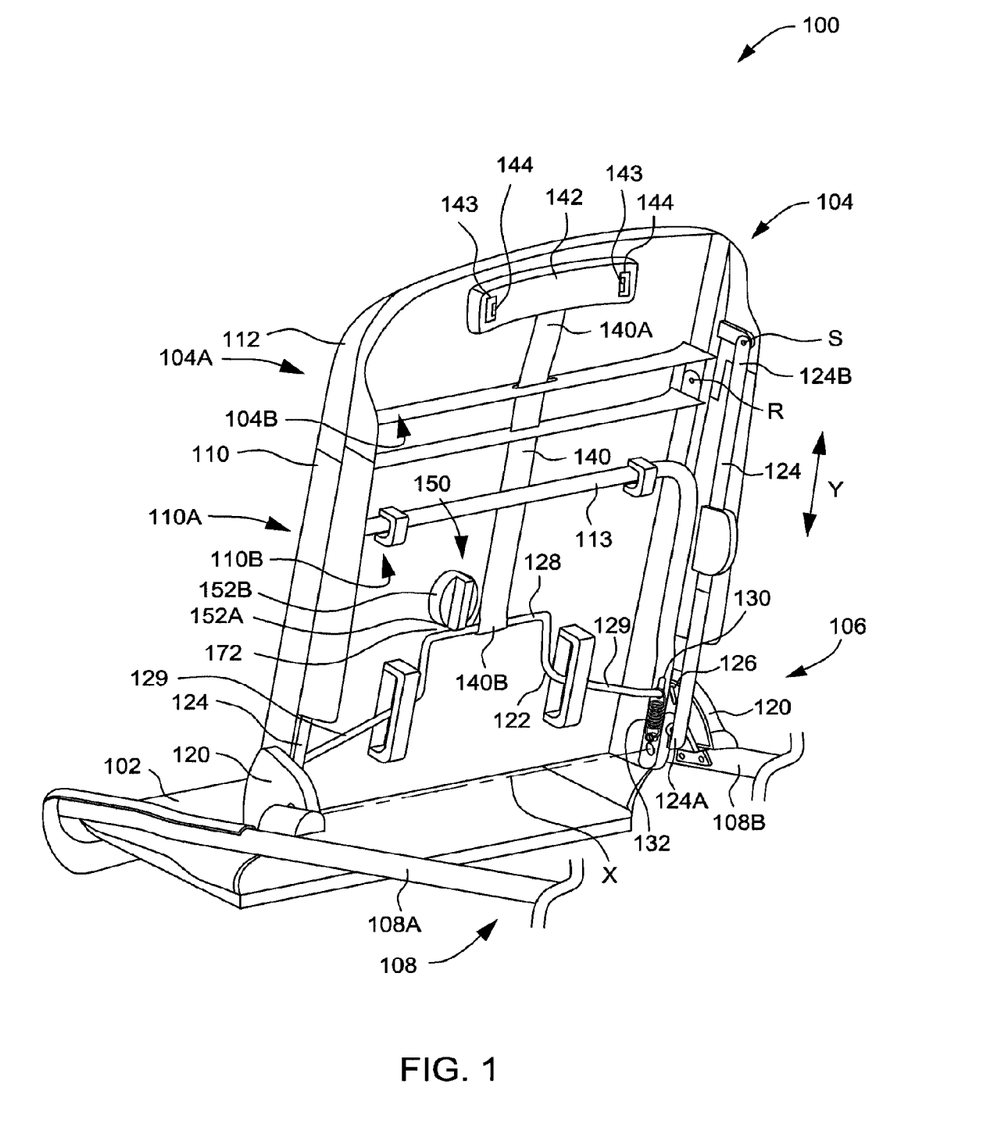
FIG. 1 is a perspective view illustrating one embodiment of a child seat in a use configuration.
Figure 2:
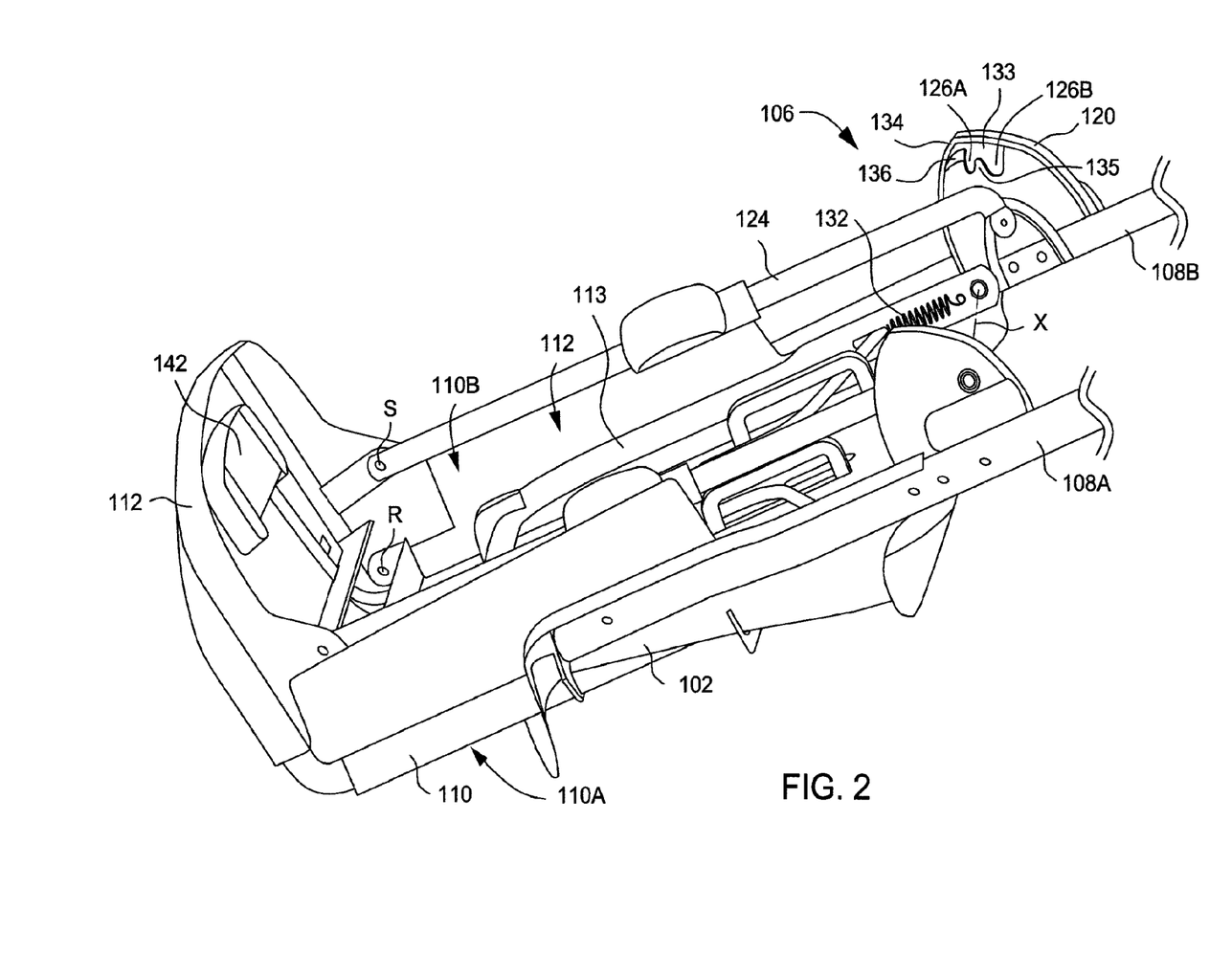
FIG. 2 is a perspective view illustrating the child seat in a forward folded state.

Reference is made to FIGS. 1 and 2 to describe one embodiment of a child seat 100. More specifically, FIG. 1 is a schematic view illustrating the child seat 100 in a use configuration for receiving the placement of a child thereon, whereas FIG. 2 is a schematic view illustrating the child seat 100 in a forward folded state adapted to accommodate an infant car seat (not shown). The child seat 100 may be implemented in various carrier devices including, without limitation, strollers, high chairs and the like. As shown in FIGS. 1 and 2, the child seat 100 includes a seat part 102, a backrest 104, and a backrest adjusting mechanism 106. The seat part 102 can be assembled or provided on a support frame 108. In one embodiment, the support frame 108 can include two support rods 108A and 108B respectively fastened with a left and right side of the seat part 102. The backrest 104 can include a backrest portion 110 and a headrest portion 112. Each of the backrest portion 110 and the headrest portion 112 can be made from panels and/or metal tubes in the form of a bent and/or welded construction. The headrest portion 112 can be pivotally coupled with a top end of the backrest portion 110 via a hinge R. A connecting tube 113 may also be affixed on a rear side of the backrest portion 110. In one embodiment, the connecting tube 113 can have a generally U-shape having left and right side sections respectively connected pivotally with the support rods 108A and 108B for forming an axis of rotation X around which the backrest 104 can rotate relative to the seat part 102.

As shown in FIG. 1, when the child seat 100 is in a use configuration, the headrest portion 112 extends upward from the backrest portion 110 approximately in parallel direction. The backrest 104 thus erects upward from the seat part 102 so that a seating area can be defined between a front side 104A of the backrest 104 and the seat part 102.

As shown in FIG. 2, when it is not used for seating a child, the child seat 100 can be folded so as to conveniently accommodate an infant car seat. For this purpose, the backrest 104 can be rotated around the axis of rotation X toward the seat part 110 until the backrest 104 lies approximately parallel and adjacent with the seat part 110 in a forward folded position. Moreover, the headrest portion 112 can also rotate around the hinge R toward a rear side 104B of the backrest portion 110 until the headrest portion 112 lies approximately perpendicular to the backrest portion 110. The rear side 104B of the backrest 104 can thereby define at least partially an accommodating space 112 that is flanked at one side by the headrest portion 112 for accommodating an infant car seat.

Aside the forward folded position, the backrest 104 can also be adjusted to different angular or lying positions relative to the seat part 102 when the child is seated on the seat part 102. As shown in FIG. 1, the backrest adjusting mechanism 106 can comprise two positioning elements 120 provided on left and right sides of the seat part 102, and a latch element 122 movably connected with the backrest 104. The positioning elements 120 can be respectively affixed on the support rods 108A and 108B so as to be stationary relative to the seat part 102. Each positioning element 120 can have a plate shape provided with a plurality of locking slots 126 disposed along different radial directions relative to the axis of rotation X of the backrest 104. The latch element 122 can engage with any one of the locking slots 126 for securing the backrest 104 at different angular positions. In one embodiment, the latch element 122 can be formed as a U-shaped tube frame having a central portion 128 and symmetrical left and right side portions 129 respectively extending at opposite sides of the central portion 128. The side portions 129 of the latch element 122 are respectively passed through guide slots 130 provided on the left and right sections of the connecting tube 113. A spring element 132 is respectively mounted between each distal end of the connecting tube 113 and a corresponding end of each side portion 129. The guide slots 130 can facilitate sliding movement of the latch element 122 along a lengthwise axis Y of the backrest portion 110 for either engaging with or disengaging from any of the locking slots 126 in the positioning element 120.

Figure 3:
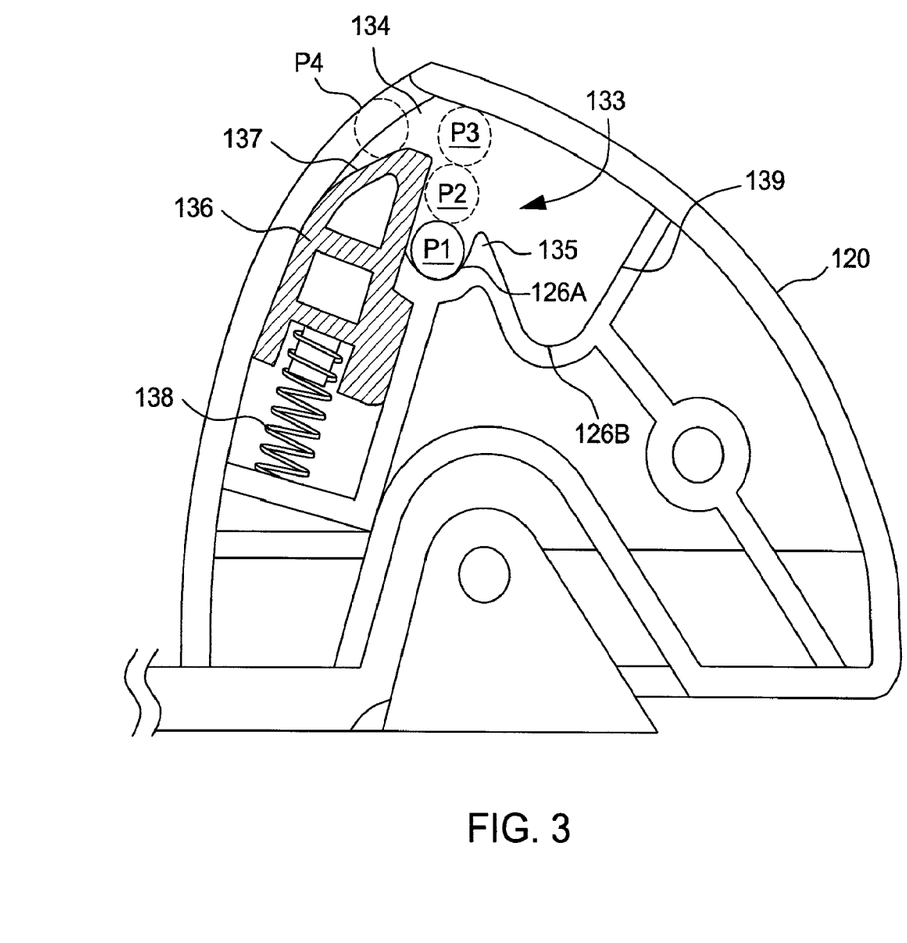
FIG. 3 is a schematic view illustrating one embodiment of a positioning element used in the child seat shown in FIG. 1.

In conjunction with FIGS. 1 and 2, FIG. 3 is a schematic view illustrating an inner structure of the positioning element 120. The locking slots 126 formed in the positioning element 120 can exemplary include first and second locking slots 126A and 126B spaced apart from each other by a sidewall 135 for securing the backrest 104 in at least two different angular positions. The locking slots 126 are provided within a channel 133 of the positioning element 120 that communicates with an opening 134 formed on a front of the positioning element 120. A sidewall of the first locking slot 126A proximate to the opening 134 is defined by a movable abuttal element 136, which also delimits a first end of the channel 133. The abuttal element 136 is assembled in a sliding manner in the positioning element 120, and has a lower end coupled with a spring element 138 that is securely anchored in the positioning element 120. While the spring element 138 and abuttal element 136 are described as separate parts assembled with each other, alternate embodiments can also form the spring element and the abuttal element in a single body, the spring element being a resilient portion extending from the abuttal element. A top of the abuttal element 136 is generally higher than the top of the sidewall 135, and includes an inclined surface 137 oriented forwardly toward the opening 134 of the positioning element 120. A second end of the channel 133 can be delimited by another sidewall opposite the abuttal element 136, e.g., sidewall 139 of the locking slot 126B. The channel 133 can therefore delimit a range of adjustable angular positions of the backrest 104 relative to the seat part 102. This range of adjustable angular positions can encompass inclination angles of the backrest 104 suitable for seating positions.

When the latch element 122 is driven in movement, the side portions 129 of the latch element 122 can move to different positions P1, P2, P3 and P4. In particular, when the backrest 104 is moved to approximately parallel to the seat part 102 in the forward folded position, the latch element 122 is located entirely outside the positioning element 120, out of engagement with any of the locking slots 126 (as shown in FIG. 2). When the backrest 104 is moved to a reverse direction for recovering the erected position shown in FIG. 1, each of the side portions 129 of the latch element 122 can reach the opening 134 and then press against the inclined surface 137 of the corresponding abuttal element 136 (i.e., position P4). The abuttal element 136 then moves to compress the spring element 138. This displacement of the abuttal element 136 can clear the path for each side portion 129 of the latch element 122 to travel through the channel 133 and then engage with any of the locking slots 126 under the resilient force exerted by the spring element 132. The spring element 138 can then urge the abuttal element 136 to recover an initial position restricting movement of the side portions 129 of the latch element 122 within the channel 133.

As shown in FIGS. 1 and 2, the central portion 128 of the latch element 122 can be connected via a link element 140 with a handle 142 provided on a rear of the backrest 104, e.g., on the rear of the headrest portion 112. In one embodiment, the link element 140 can be a strap or rigid elongated rod having a first end 140A joined with the handle 142 and a second end 140B joined with the central portion 128 of the latch element 122. The handle 142 can be mounted in a sliding manner on a rear side of the headrest portion 112. For example, protruding tips 144 projecting from the rear of the headrest portion 112 can be respectively assembled through slide slots 143 on left and right sides of the handle 142 for allowing sliding movements of the handle 142 parallel with the axis Y. Accordingly, the handle 142 can slide upward or downward depending on the position of the headrest portion 112, a user's pulling force and/or spring force by the spring element 132. A pulling action applied on the handle 142 can be transmitted via the link element 140 to the latch element 122 to cause the latch element 122 to disengage from the positioning element 120. The backrest 104 can be then rotated to adjust its inclination relative to the seat part 102.

Referring again to FIGS. 1 and 2, the child seat 100 can also include two connecting links 124 provided on left and right sides of the backrest 104. Each of the connecting links 124 can include an elongated rod having a first end 124A and an opposite second end 124B. The first ends 124A of the connecting links 124 can be pivotally anchored with the seat part 102 or support rods 108A and 108B. The second ends 124B of the connecting links 124 are respectively connected with the headrest portion 112 via hinges S that can have an axis of rotation substantially parallel with the axis of rotation R between the headrest portion 112 and the backrest portion 110. When the backrest 104 is unfolded toward the position shown in FIG. 1, a resulting rotation of the connecting links 124 can push on the headrest portion 112 so that the headrest portion 112 can rotate around the axis of rotation R until it reaches a position approximately parallel with the backrest portion 110. Conversely, when the backrest 104 is folded toward the position shown in FIG. 2, the connecting links 124 can rotate in a reverse direction to pull the headrest portion 112 toward a rear side 110B of the backrest portion 110. As a result, the headrest portion 112 is turned to a substantially perpendicular position erecting from the rear side 110B of the headrest portion 112.

Figure 5:
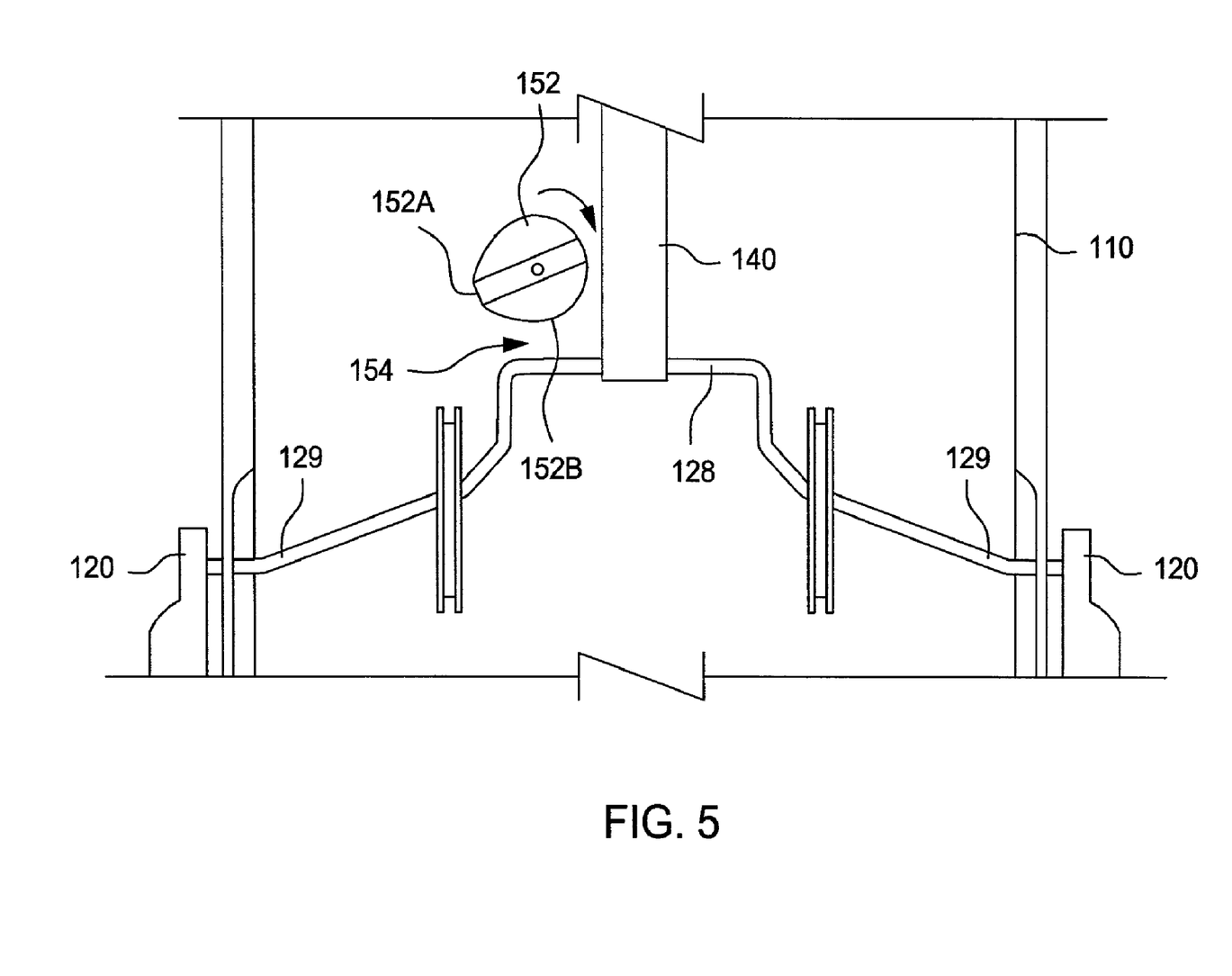
FIG. 5 is a partially enlarged view illustrating an operation of the safety lock.

In order to prevent accidents caused by inadvertent adjustment of the backrest 104 to a position parallel with the seat part 102, the rear side 104B of the backrest 104 can also include an additional safety measure, which can be embodied as a safety lock 150. As shown in FIG. 1, the safety lock 150 can comprise a rotary knob 152 that is pivotally mounted on a rear surface of the backrest portion 110 at a location spaced apart from the central portion 128 of the latch element 122. An outer periphery of the rotary knob 152 can include a first edge portion 152A and a second edge portion 152B. The rotary knob 152 can rotate in either direction so that either of the first edge portion 152A and second edge portion 152B is oriented toward the central portion 128 of the latch element 122. For example, when the rotary knob 152 is turned to a lock position as shown in FIG. 1, the first edge portion 152A of the rotary knob 152 can face and lie adjacent to the central portion 128 of the latch element 122 for restricting a sliding course of the latch element 122 relative to the backrest 104 and channel 133 in the positioning element 120. When the rotary knob 152 is turned to an unlock position as shown in FIG. 5, the second edge portion 152B of the rotary knob 152 can face the central portion 128 of the latch element 122 so that a maximum gap distance 154 can be defined between the second edge portion 152B of the rotary knob 152 and the central portion 128 of the latch element 122.

Figure 4:
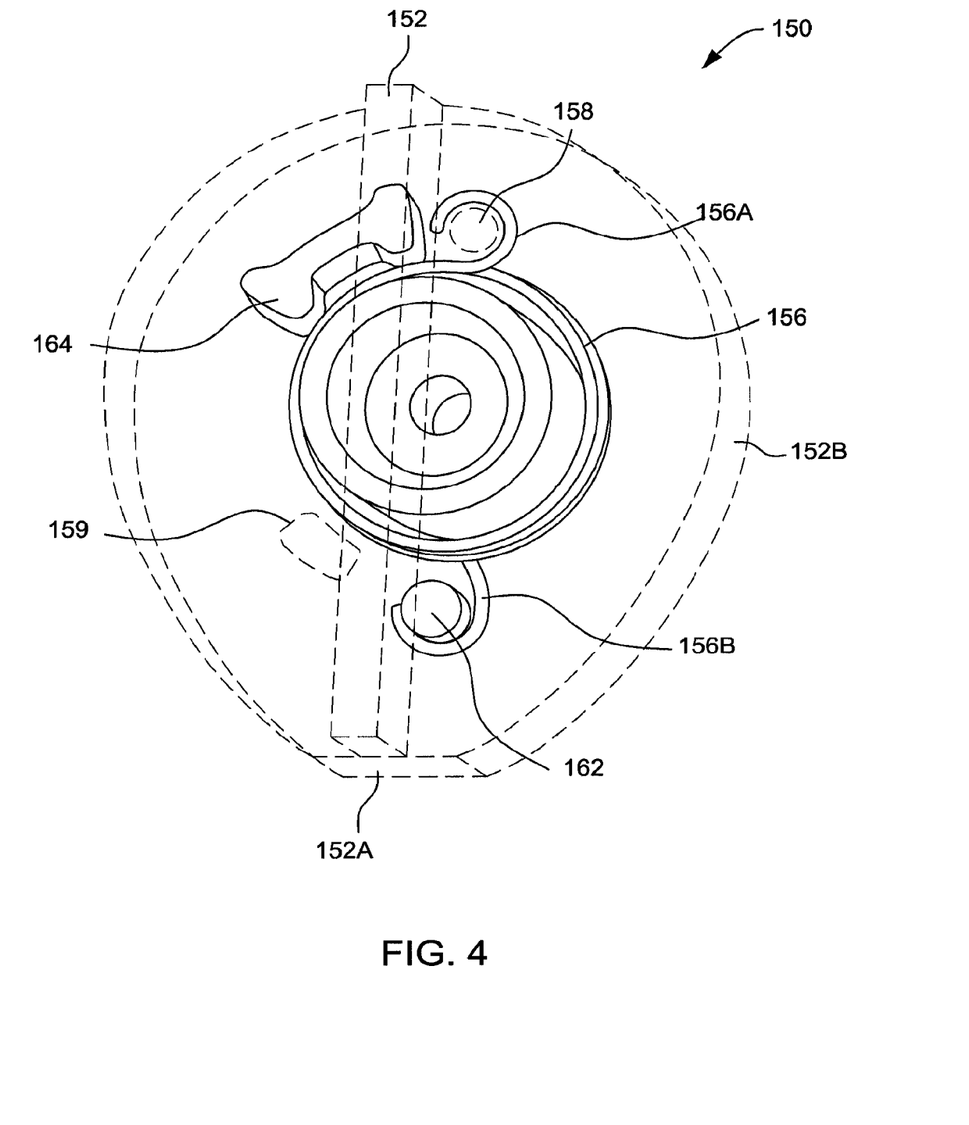
FIG. 4 is a schematic view illustrating one embodiment of a safety lock used in the child seat shown in FIG. 1.

FIG. 4 is a schematic view illustrating the internal construction of the safety lock 150. One embodiment of the safety lock 150 can include the rotary knob 152 (shown with dotted lines in FIG. 4) pivotally assembled on the rear surface of the backrest portion 110, and a torsion spring 156 anchored with the backrest portion 110 and having one end connected with the rotary knob 152. More specifically, an inner side of the rotary knob 152 can include a stud 158 and a restricting flange 159 respectively projecting toward the rear surface of the backrest portion 110. In addition, an anchor stud 162 and stop protrusion 164 can also be provided on the rear surface of the backrest portion 110. A first end 156A of the torsion spring 156 can be fixedly secured with the anchor stud 162, whereas a second end 156B opposite the first end 156A of the torsion spring 156 can be fixedly secured with the stud 158 of the rotary knob 152. When the rotary knob 152 is rotated in a first direction from the first position shown in FIG. 1 toward the second position shown in FIG. 5, the torsion spring 156 can be twisted to store elastic force. The rotary knob 152 may be stopped at the second position by abutment between the restricting flange 159 of the rotary knob 152 against the stop protrusion 164. When the rotary knob 152 is released from the second position, the elastic force applied by the torsion spring 156 can bias the rotary knob 152 to rotate in a reverse direction so that the rotary knob 152 can recover the first position.

Exemplary operation of the child seat 100 is now described with reference to FIGS. 1 through 5. FIG. 1 shows the child seat 100 is in a use configuration. In this configuration, the side portions 129 of the latch element 122 can respectively engage with the first slots 126A of the positioning element 120 (i.e., the side portions 129 are at the position P1 shown in FIG. 3) for blocking rotation of the backrest 104 relative to the seat part 102. The headrest portion 112 extends upward approximately parallel from a top of the backrest portion 110 to provide support for the head of a child. In this configuration, the seat part 102 and the backrest 104 can thus form a space adapted to receive placement of a child.

For preventing inadvertent adjustment, the safety lock 150 can be turned to a lock state, i.e., the first edge portion 152A of the rotary knob 152 is oriented toward the central portion 128 of the latch element 122 so as to define a maximum gap distance 172 between the first edge portion 152A of the rotary knob 152 and the central portion 128 of the latch element 122. In this lock position, the safety lock 150 can restrict a course of the latch element 122 relative to the channel 133, so that each side portion 129 of the latch element 122 can be kept within the channel 133.

Referring to FIGS. 1 and 3, if a user tries to pull upward the link element 140 via the handle 142, the central portion 128 of the latch element 122 will slide and abut against the first edge portion 152A of the rotary knob 152, while each side portion 129 is still confined within the channel 133 of each positioning element 120 and cannot move out of the positioning element 120 (the side portions 129 of the latch element 122 may at most move to the position P2 to disengage from the locking slots 126), blocked by the abuttal element 136. Accidental displacement the backrest 104 to a position substantially parallel with the seat part 102 can be thereby blocked.

It is worth noting that the lock position of the safety lock 150 is mainly used for restricting the maximum course of the latch element 122 for disengaging from the locking slots 126.

In other words, when the side portions 129 of the latch element 122 are moved to the positions P2, the latch element 122 is out of engagement with the first locking slot 126A and the side portions 129 are still allowed to travel through the channel 133 toward the second locking slot 126B for adjusting the angular position of the backrest 104 relative to the seat part 102. Accordingly, while complete forward folding of the backrest 104 is blocked owing to the abutment between the side portion 129 of the latch element 122 and the abuttal element 136, angular adjustment of the backrest 104 relative to the seat part 102 is permitted for setting the desired seating position.

In conjunction with FIGS. 2 and 3, FIG. 5 is a schematic view illustrating an operation for unlocking the safety lock 150. If a user wants to fold the backrest 104 toward a position substantially parallel with the seat part 102, the rotary knob 152 of the safety lock 150 must first be rotated in a first (e.g., clockwise) direction to twist the torsion spring 156. When the restricting flange 159 of the rotary knob 152 abuts against the stop protrusion 164, the unlock position of the safety lock 150 is reached, and the second edge portion 152B of the rotary knob 152 faces the central portion 128 of the latch element 122 so as to define a maximum gap distance 154 between the second edge portion 152B of the rotary knob 152 and the central portion 128 of the latch element 122. Because the gap distance 154 is larger than the previous gap distance 172, the unlock position of the safety lock 150 can enlarge the maximum course of the latch element 122 relative to the seat part 102 and channel 133. Accordingly, the user can pull the link element 140 via the handle 142 to cause longer upward sliding of the latch element 122. The larger course of the latch element 122 can then move the side portions 129 to the positions P3 out of engagement with the abuttal element 136. The backrest 104 can be then rotated around the axis of rotation X toward a position parallel with the seat part 102, which will cause the side portions 129 of the latch element 122 to leave the channel 133 and exit the positioning element 120 via the opening 134. As the backrest 104 rotates, a pulling action can also be applied on the headrest portion 112 via the link element 140. Consequently, the headrest portion 112 can rotate around the axis of rotation R toward the rear side 110B of the backrest portion 110 until the headrest portion 112 lies approximately perpendicular to the backrest portion 110 (as shown in FIG. 2). In this manner, an accommodating space 112 can be defined between the rear side 110B of the backrest portion 110 and the headrest portion 112. Once the side portions 129 of the latch element 122 have completely left the abuttal element 136 of the positioning element 120, the user can release the rotary knob 152, which can then rotate in a reverse direction driven by the torsion spring 156 for recovering the lock position.

When the user wants to adjust the backrest 104 from the forward folded position to the unfolded position, the backrest 104 can be pushed to rotate rearward. As a result, the link element 124 can drive rotation of the headrest portion 112 about the axis of rotation R toward the front side 110A of the backrest portion 110. As the backrest portion 110 rotates, the side portions 129 of the latch element 122 can reach the opening 134 of the positioning element 120 and push against the inclined surface 137 of the abuttal element 136 (i.e., position P4 shown in FIG. 3). Consequently, the abuttal element 136 can retract and compress the spring element 138 so as to allow the side portions 129 of the latch element 122 to travel through the channel 133 in the positioning element 120. By action of the spring elements 132, the side portions 129 of the latch element 122 can then engage with any of the locking slots 126 (e.g., locking slot 126A corresponding to the position P1 shown in FIG. 3). Once the side portions 129 of the latch element 122 enters the channel 133, the spring element 138 can push upward the abuttal element 136 so that the abuttal element 136 can recover its initial position for restricting the movement range of the side portions 129 of the latch element 122 within the channel 133.

It is worth noting that the safety lock 150 can be kept in the locked state during adjustment of the backrest 104 from the folded position to the unfolded position. A resulting abutment between the first edge portion 152A of the rotary knob 152 and the central portion 128 of the latch element 122 can provide a counteraction that can facilitate the pushing action applied by the latch element 122 on the inclined surface 137 of the abuttal element 136 when each side portion 129 reaches the opening 134, as described previously.

In alternate embodiments, an assembly similar to that of the abuttal element 136 and spring element 138 can also be provided at the rear of the second locking slot 126B. The additional abuttal element can have an inclined surface (functionally equivalent to the inclined surface 137) oriented rearward, and a surface that is adapted to form a locking engagement with the latch element 122 for preventing the backrest 104 to rotate to a rearward lie-down position opposite the forward folded position shown in FIG. 2. In this rearward lie-down position, the backrest 104 can allow a child to lie down on the back.

At least one advantage of the child seat described herein is the ability to provide a safety lock that can prevent accidental displacement the backrest to a position parallel with the seat part. The safety of the child seat in use is therefore improved.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child seat comprising:
   a seat part;
   a backrest operable to rotate relative to the seat part;
   a backrest adjusting mechanism, comprising a positioning structure provided stationary relative to the seat part, and a latch element mounted on the backrest, wherein the positioning structure comprises a channel that delimits a range of first positions of the backrest relative to the seat part, the latch element engaging with the positioning structure to hold the backrest in any of the first positions; and
   a safety lock movably mounted on the backrest and operable independently from the latch element, wherein the safety lock has a lock position adapted to restrict displacement of the latch element relative to the channel such that an adjustment range of the backrest is limited to the first positions, and an unlock position enabling the latch element to move out of the channel as the backrest is adjusted toward a second position lying substantially parallel with the seat part.

2. The child seat according to claim 1, wherein the channel comprises a plurality of slots, and the latch element is movable relative to the backrest to engage with any one of the slots for holding the backrest at an angle relative to the seat part.

3. The child seat according to claim 2, wherein the safety lock is provided on a rear side of the backrest, and the latch element moves toward the safety lock for disengaging from any one of the slots in the positioning structure.

4. The child seat according to claim 2, wherein the lock position of the safety lock delimits a maximum course of the latch element relative to the backrest in a direction for disengaging from any one of the slots.

5. The child seat according to claim 4, wherein the unlock position of the safety lock enlarges the maximum course of the latch element relative to the backrest.

6. The child seat according to claim 1, wherein the safety lock comprises a rotary knob.

7. The child seat according to claim 6, wherein the safety lock further includes a torsion spring operable to bias the rotary knob from the unlock position to the lock position.

8. The child seat according to claim 1, wherein at least one end of the channel comprises a movable abuttal element coupled with a spring element, the latch element pushing against and causing displacement of the abuttal element to enter the channel when the backrest is adjusted from the position lying substantially parallel with the seat part to any of the first positions.

9. A child seat comprising:
   a seat part;
   a backrest operable to rotate relative to the seat part;
   a backrest adjusting mechanism, comprising a positioning element mounted stationary relative to the seat part, and a latch element mounted on the backrest and movable to engage with the positioning element, wherein the positioning element comprises a channel that delimits a range of adjustable angular positions of the backrest relative to the seat part; and
   a safety lock movably mounted on the backrest, wherein the safety lock has a lock position adapted to restrict displacement of the latch element relative to the channel, and an unlock position enabling the latch element to move out of the channel when the backrest is moved out of the range of adjustable angular positions toward a position lying substantially parallel with the seat part;
   wherein the backrest includes a headrest portion that rotates toward a rear side of the backrest when the backrest is adjusted to the position lying substantially parallel with the seat part.

10. A child seat comprising:
    a seat part;
    a backrest operable to rotate relative to the seat part;
    a backrest adjusting mechanism, comprising a positioning structure provided stationary relative to the seat part, and a latch element mounted on the backrest, wherein the positioning structure comprises a channel along which the latch element moves as the backrest is adjusted between multiple first positions relative to the seat part, and the latch element is operable to engage with the positioning structure to hold the backrest in any of the first positions; and
    a safety lock movably mounted on the backrest, wherein the safety lock has a lock position and an unlock position, the safety lock when in the lock position restricts movements of the latch element within boundaries of the channel such that an adjustment range of the backrest is limited to the first positions, and the safety lock when in the unlock position allows the latch element to move outside the channel as the backrest is adjusted toward a second position lying substantially parallel with the seat part.

11. The child seat according to claim 10, wherein the channel comprises a plurality of slots, and the latch element is movable relative to the backrest to engage with any one of the slots for holding the backrest at any of the first positions relative to the seat part.

12. The child seat according to claim 11, wherein the safety lock is provided on a rear side of the backrest, and the latch element moves toward the safety lock for disengaging from any one of the slots in the positioning structure.

13. The child seat according to claim 11, wherein the lock position of the safety lock delimits a maximum course of the latch element relative to the backrest in a direction for disengaging from any one of the slots.

14. The child seat according to claim 13, wherein the unlock position of the safety lock enlarges the maximum course of the latch element relative to the backrest in the direction for disengaging from any one of the slots.

15. The child seat according to claim 10, wherein the safety lock comprises a rotary knob, and a torsion spring operable to bias the rotary knob toward the lock position.

16. The child seat according to claim 10, wherein at least one end of the channel comprises a movable abuttal element coupled with a spring element, the latch element pushing against and causing displacement of the abuttal element to enter the channel when the backrest is adjusted from the second position lying substantially parallel with the seat part to any of the first positions.

17. A child seat comprising:
a seat part;
a backrest operable to rotate relative to the seat part;
a backrest adjusting mechanism, comprising a positioning structure provided stationary relative to the seat part, and a latch element mounted on the backrest and movable to engage with the positioning structure to hold the backrest in multiple first positions inclined relative to the seat part; and
a safety lock operable between a lock state and an unlock state independently from the latch element, wherein the safety lock when in the lock state limits an adjustment range of the backrest to the first positions, and the safety lock when in the unlock state allows movements of the backrest outside the adjustment range of the first positions.

18. The child seat according to claim 17, wherein the safety lock when in the unlock state allows adjustment of the backrest to a second position that is outside the adjustment range of the first positions and substantially parallel to the seat part.

19. The child seat according to claim 17, wherein the safety lock comprises a rotary knob having a first edge portion that is oriented toward the latch element when the safety lock is in the lock state, and a second edge portion that is oriented toward the latch element when the safety lock is in the unlock state.

20. The child seat according to claim 19, wherein the first and second edge portion respectively delimit a first and a second maximum course of the latch element in a direction that disengages the latch element from the positioning structure for allowing adjustment of the backrest, the second maximum course being greater than the first maximum course.

21. The child seat according to claim 17, wherein the positioning structure includes a movable abuttal element coupled with a spring element, and the latch element pushes and causes displacement of the abuttal element as the backrest is adjusted from the second position to any of the first positions.

* * * * *